J. L. NISWANDER.
DEMOUNTABLE RIM REMOVER.
APPLICATION FILED NOV. 7, 1917.
1,274,751.
Patented Aug. 6, 1918.
2 SHEETS—SHEET 2.
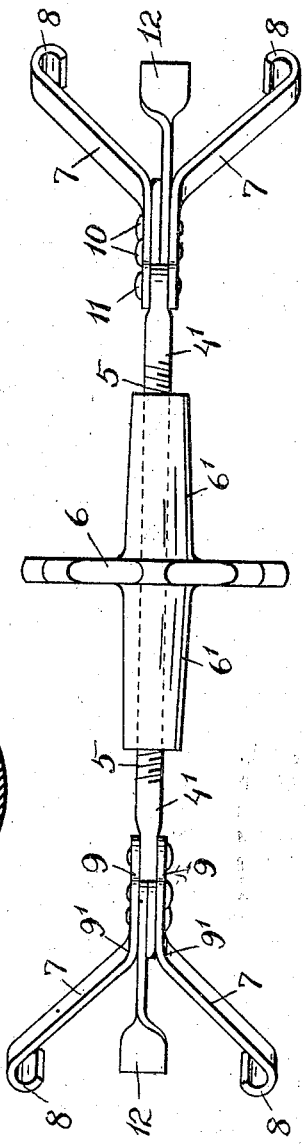
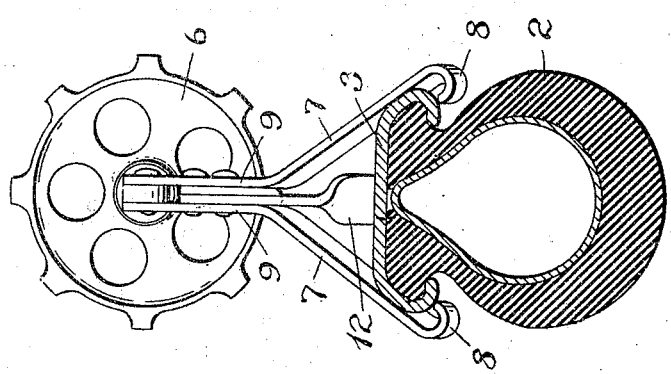
Inventor-
John L. Niswander
by E. W. Anderson & Son
Attys

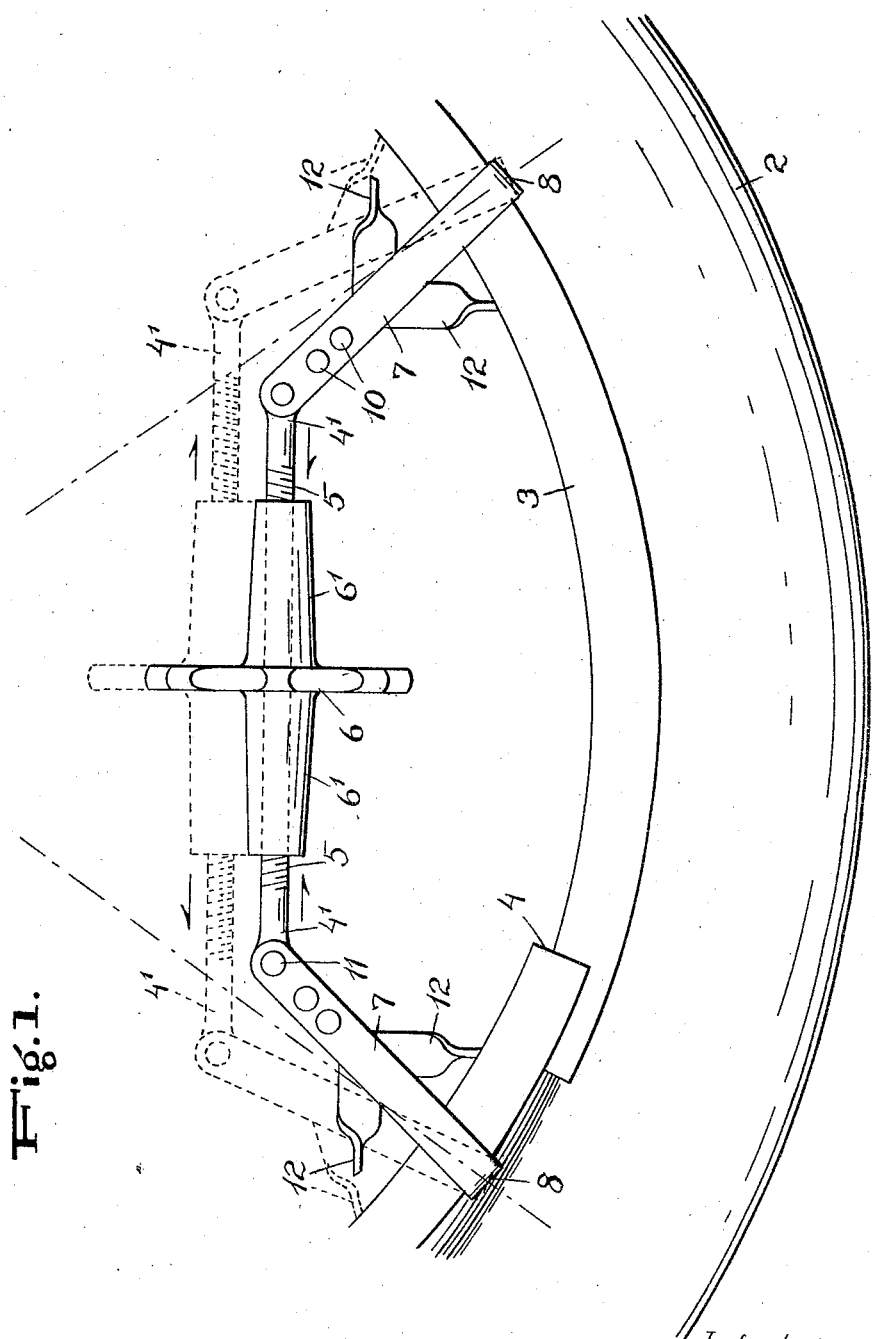

UNITED STATES PATENT OFFICE.

JOHN L. NISWANDER, OF QUINCY, ILLINOIS.

DEMOUNTABLE-RIM REMOVER.

1,274,751.

Specification of Letters Patent.

Patented Aug. 6, 1918.

Application filed November 7, 1917. Serial No. 200,807.

*To all whom it may concern:*

Be it known that I, JOHN L. NISWANDER, a citizen of the United States, resident of Quincy, in the county of Adams and State of Illinois, have made a certain new and useful Invention in Demountable-Rim Removers; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1 is a side view of the invention as applied, to remove the rim, the portion of the invention in replacing a rim being shown in dotted lines.

Fig. 2 is an end view of the invention, as applied.

Fig. 3 is a plan view.

The invention has relation to means for removing and replacing demountable rims from automobile tires, having for its object the provision of an improved device for this purpose. The invention consists in the novel construction and combinations of parts, as hereinafter set forth.

In the accompanying drawings, illustrating the invention, the numeral 2 designates the tire and 3 the demountable rim, split at 4 in the usual way, and which, as well known, is difficult of removal and replacement, owing to the necessary stiffness and strength of the parts.

The shank or body of the device consists of two longitudinally alined rods 4', 4', the opposed end portions of which are screw-threaded at 5, 5, in opposite directions, a hand wheel or turnbuckle 6 engaging the threaded portions of these rods.

The gripping members or rim hooks of the device consist each of diverging branches 7, 7; having reversely turned or hooked ends 8, 8, designed to engage with the opposite laterally projecting portions of the rim, the branches being sprung over these rim portions and automatically contracting through inherent resiliency to grip the same. The diverging branches of each gripper have parallel inner portions 9, 9, bent at obtuse angles thereto at 9', bolts 10 connecting the parallel portions of the branches together and end bolts 11 connecting the branches of each gripper pivotally to the outer end portions of the rods 4, 4.

Each rim gripper has rigidly connected thereto inclined braces or struts 12, 12, extending transversely of the branches 7, 7; one of said braces upon each gripper being always in position to take biting engagement with the inner surface of the rim in the operation of the device.

In the use of the device to remove a rim, the grippers are pushed to hook over the demountable rim and, the length of the rods 4 being correct, these grippers, being preferably of flat metal, will tend to assume a position substantially radial with respect to the rim and wheel, the braces 12, having contact with the inner surface of the rim, acting in a manner to limit the outward movement of the grippers. In this operation, the hand holds afforded by the hub extensions 6' of the hand wheel 6 are of assistance. The angular relation of the grippers is now altered slightly, to bring the inner braces 12 into biting engagement with the rim.

The hand wheel being now rotated to adjust the rods 4 toward each other, the radial relation of the grippers 7 to the wheel will be substantially preserved by the biting engagement of the braces 12 with the rim. In other words, the tendency of the normally substantially radial grippers to assume under strain an angular relation to the alined rods 4 more nearly in line therewith will be effectually resisted by the braces.

In replacing a rim upon a tire, the hand wheel is adjusted reversely, to adjust the rods away from each other, the braces located upon the outer sides of the grippers being engaged with the rim, to resist the tendency of the grippers to move toward each other under strain.

By means of this device the demountable rim may be contracted from one to four inches by an even and steady pull, the grippers and the rim braces gripping the rim more tightly as the pull is increased. These rim hooks or grippers, being made of spring steel, will adjust themselves to any width of rim. The grippers catch the rim at both circumferential edges thereby avoiding danger of distortion of the rim, and there being an equal pull exerted upon both sides of the rim, danger of spinning the rim in the tire, and tearing the inner tube is obviated.

The weight of the device is but 2½ pounds, and it folds to a length of nine inches, being adapted to be carried in the tool box of the car.

I claim:

1. A device for removing and replacing demountable rims of vehicle tires, consisting of alined rods oppositely screw-threaded, a turnbuckle connecting said rods, a gripper pivotally connected to the outer end of each rod and made up of diverging resilient shanks having hooked outer ends and parallel approximated inner ends and an inclined brace the inner end of which is located between and rigidly connected to the inner ends of the gripper shanks, each gripper having substantially radial relation to the tire and adapted to be sprung over the rim, said brace having at its outer end biting engagement with the inner surface of the rim.

2. A device for removing and replacing demountable rims of vehicle tires, consisting of alined rods oppositely screw-threaded, a turnbuckle connecting said rods, a gripper pivotally mounted at the outer end of each rod and composed of diverging resilient shanks having hooked outer ends and parallel approximated inner ends, and oppositely inclined braces for each gripper and the inner ends of which are located between and rigidly connected to the inner ends of the gripper shanks, each gripper having substantially radial relation to the tire and adapted to be sprung over the rim, the braces of each gripper having alternative biting engagement with the inner surface of the rim in removing and in replacing the same.

In testimony whereof I affix my signature in presence of two witnesses.

JOHN L. NISWANDER.

Witnesses:
FRED. N. BENER,
LYMAN MCCARL.